United States Patent
Yoshioka et al.

(10) Patent No.: US 11,306,690 B2
(45) Date of Patent: Apr. 19, 2022

(54) EGR GAS DISTRIBUTOR

(71) Applicant: AISAN KOGYO KABUSHIKI KAISHA, Obu (JP)

(72) Inventors: Mamoru Yoshioka, Nagoya (JP);
Kaisho So, Nagoya (JP)

(73) Assignee: AISAN KOGYO KABUSHIKI KAISHA, Obu (JP)

(*) Notice: Subject to any disclaimer, the term of this patent is extended or adjusted under 35 U.S.C. 154(b) by 0 days.

(21) Appl. No.: 17/111,102

(22) Filed: Dec. 3, 2020

(65) Prior Publication Data

US 2021/0199075 A1    Jul. 1, 2021

(30) Foreign Application Priority Data

Dec. 26, 2019   (JP) .............................. JP2019-236269

(51) Int. Cl.
| | |
|---|---|
| *F02M 26/44* | (2016.01) |
| *F02M 26/19* | (2016.01) |
| *F02M 26/41* | (2016.01) |
| *F02M 26/20* | (2016.01) |
| *F02M 26/17* | (2016.01) |
| *F02M 35/10* | (2006.01) |

(52) U.S. Cl.
CPC ............ *F02M 26/44* (2016.02); *F02M 26/17* (2016.02); *F02M 26/19* (2016.02); *F02M 26/20* (2016.02); *F02M 26/41* (2016.02); *F02M 35/10222* (2013.01)

(58) Field of Classification Search
CPC ........ F02M 26/17; F02M 26/19; F02M 26/20; F02M 26/41; F02M 26/44; F02M 35/10222
See application file for complete search history.

(56) References Cited

U.S. PATENT DOCUMENTS

| | | | |
|---|---|---|---|
| 10,208,715 B1* | 2/2019 | Wicks | .................... F02M 26/44 |
| 10,247,089 B1* | 4/2019 | Wicks | ................. F02B 29/0468 |
| 11,008,983 B1* | 5/2021 | Yoshioka | ......... F02M 35/10222 |
| 2004/0159299 A1* | 8/2004 | Uchiyama | .............. F02M 26/23 |
| | | | 123/184.42 |

(Continued)

FOREIGN PATENT DOCUMENTS

| | | | |
|---|---|---|---|
| JP | 2005083312 A | * | 3/2005 |
| JP | 2012225170 A | * | 11/2012 |

(Continued)

*Primary Examiner* — John M Zaleskas
(74) *Attorney, Agent, or Firm* — Oliff PLC

(57) ABSTRACT

An EGR gas distributor for distributing EGR gas to branch pipes of an intake manifold includes a plurality of gas distribution passages arranged side by side for the branch pipes, a gas inflow passage and a gas chamber to deliver the EGR gas to each of the gas distribution passages. The gas inflow passage includes two, first and second, gas passage parts branched in a single stage. When the EGR gas distributor is mounted on the intake manifold, a passage cross-section of each gas passage part perpendicular to a central axis has an uppermost vertex and a lowermost vertex. The passage cross-sections of the gas passage parts are sized such that their lengths in a vertical direction are gradually longer from an upstream side of the first gas passage part to a downstream side of the second gas passage part.

7 Claims, 15 Drawing Sheets

(56) References Cited

U.S. PATENT DOCUMENTS

| | | | | |
|---|---|---|---|---|
| 2005/0039730 A1* | 2/2005 | Nishida | .................. | F02M 26/41 |
| | | | | 123/568.17 |
| 2006/0191505 A1* | 8/2006 | Doko | .............. | F02M 35/10347 |
| | | | | 123/184.59 |
| 2010/0037601 A1* | 2/2010 | Pierpont | ................ | F02M 26/19 |
| | | | | 60/323 |
| 2013/0306041 A1* | 11/2013 | Koga | ................ | F02M 26/44 |
| | | | | 123/568.11 |
| 2014/0014056 A1* | 1/2014 | Sato | ....................... | F02M 26/41 |
| | | | | 123/184.47 |
| 2015/0252755 A1* | 9/2015 | Sato | ....................... | F02M 26/44 |
| | | | | 123/568.29 |
| 2017/0122233 A1* | 5/2017 | Didonato | ............ | F02M 26/53 |
| 2017/0211519 A1* | 7/2017 | Ito | ....................... | F02M 35/104 |
| 2017/0226968 A1* | 8/2017 | Nakamura | ............. | F02M 26/20 |
| 2017/0284342 A1* | 10/2017 | Terai | ...................... | F02M 26/44 |
| 2017/0306895 A1* | 10/2017 | Teramoto | .............. | F02M 26/19 |
| 2018/0045150 A1* | 2/2018 | Ito | ....................... | F02M 26/44 |
| 2018/0119655 A1* | 5/2018 | Ito | ....................... | F02M 35/112 |
| 2018/0149120 A1* | 5/2018 | Ito | ................... | F02M 35/10222 |
| 2018/0171944 A1* | 6/2018 | Nakamura | ............ | F02M 35/104 |
| 2018/0283325 A1* | 10/2018 | Nagata | .................. | F02M 35/112 |
| 2018/0347520 A1* | 12/2018 | Sakurai | ................ | F02M 35/112 |
| 2018/0363600 A1* | 12/2018 | Yamaguchi | ...... | F02M 35/10144 |
| 2019/0136803 A1* | 5/2019 | So | ....................... | F02M 35/1045 |
| 2019/0170095 A1* | 6/2019 | Yasue | .................... | F02M 26/32 |
| 2019/0218960 A1* | 7/2019 | Wicks | ....................... | F02F 1/22 |
| 2019/0218965 A1* | 7/2019 | Wicks | .................... | F02M 25/14 |
| 2019/0219005 A1* | 7/2019 | Wicks | .................... | F01N 13/082 |
| 2020/0408174 A1* | 12/2020 | Sumi | ................ | F02M 35/10222 |
| 2021/0010446 A1* | 1/2021 | Yoshioka | ............... | F02M 26/17 |

FOREIGN PATENT DOCUMENTS

| | | | |
|---|---|---|---|
| JP | 2017008855 A | * | 1/2017 |
| JP | 2017-141675 A | | 8/2017 |
| JP | 2018080658 A | * | 5/2018 |
| JP | 2018-091332 A | | 6/2018 |
| JP | 2019085992 A | * | 6/2019 |

* cited by examiner

EGR GAS DISTRIBUTOR

CROSS-REFERENCE TO RELATED APPLICATIONS

This application is based upon and claims the benefit of priority from Japanese Patent Application No. 2019-236269 filed on Dec. 26, 2019, the entire contents of which are incorporated herein by reference.

BACKGROUND

Technical Field

The present disclosure relates to an EGR gas distributor to be mounted on an intake manifold to distribute EGR gas to a plurality of cylinders of an engine.

Related Art

As one of the above type of techniques, conventionally, there has been known a gas distributor (an EGR gas distributor) disclosed for example in Japanese unexamined patent application publication No. 2017-141675 (JP 2017-141675A). This EGR gas distributor is provided with a volume chamber (a gas chamber) for collecting therein EGR gas, an upstream gas splitting passage (a gas inflow passage) placed upstream of the gas chamber and configured to introduce EGR gas into the gas chamber, and a plurality of downstream gas splitting passages (gas distribution passages) placed downstream of the gas chamber and configured to deliver the EGR gas from the gas chamber into a plurality of branch pipes of the intake manifold. The gas chamber has a long shape extending across the plurality of branch pipes. Along the longitudinal direction of this gas chamber, the plurality of gas distribution passages is arranged side by side. The gas inflow passage includes an inlet passage part extending from an inlet and a plurality of branch passage parts branching off from the inlet passage part. Each outlet of the branch passage parts is connected to the gas chamber. Specifically, the gas inflow passage and the gas chamber are configured to allow the EGR gas introduced therein through the inlet of the inlet passage part to flow in a stepwise manner into each of gas outflow passages through the plurality of branch passage parts and the gas chamber. Herein, the inner wall of the gas chamber on the downstream side (i.e., the inner wall in which the gas distribution passages open) is divided into a plurality of inner walls individually corresponding to the branch pipes, the inner wall being sloped, or inclined, toward openings of the gas distribution passages. Accordingly, condensed water generated in the gas chamber is guided along the divided, inclined inner walls to each gas distribution passage on the downstream side and thus easily allowed to flow down naturally, i.e., by gravity. This can avoid the condensed water from concentrically flowing in a specified one or ones of the gas distribution passages.

SUMMARY

Technical Problem

Meanwhile, the EGR gas distributor disclosed in JP 2017-141675A makes it easy for the condensed water to naturally flow down into each gas distribution passage downstream of the gas chamber. However, JP 2017-141675A does not particularly disclose any configuration related to natural downward flow of condensed water in the gas inflow passage upstream of the gas chamber. Herein, it is also conceivable to provide a gas inflow passage inclined to facilitate natural downward flow of condensed water. However, conventionally, due to a limited mounting space in a vehicle, it would be difficult to incline a gas inflow passage to facilitate natural downward flow of condensed water to a downstream side except that the EGR gas distributor is increased in size.

The present disclosure has been made to address the above problems and has a purpose to provide an EGR gas distributor capable of facilitating natural downward flow of condensed water in a gas passage without the need to increase the size of the EGR gas distributor.

Means of Solving the Problem

To achieve the above-mentioned purpose, one aspect of the present disclosure provides an EGR gas distributor configured to distribute EGR gas to each of a plurality of branch pipes constituting an intake manifold, the EGR gas distributor comprising: a plurality of gas distribution passages arranged side by side to distribute EGR gas to the plurality of branch pipes; a gas passage branched off to allow EGR gas to flow to the plurality of gas distribution passages, wherein the gas passage includes a plurality of gas passage parts branched off in multiple stages, the gas passage parts including a final-stage gas passage part to which the gas distribution passages are provided, and each of the gas passage parts has a passage cross-section taken perpendicular to a central axis so that the passage cross-section has a shape including an uppermost vertex and a lowermost vertex in at least a portion when the EGR gas distributor is mounted on the intake manifold.

The foregoing configuration can facilitate easily natural downward flow of condensed water in an EGR gas passage without particularly increasing the size of the EGR gas distributor.

DETAILED DESCRIPTION OF THE EXEMPLARY EMBODIMENTS

First Embodiment

A detailed description of a first embodiment of an EGR gas distributor according to the present disclosure will now be given referring to the accompanying drawings.
(Intake Manifold)

Figure 1:
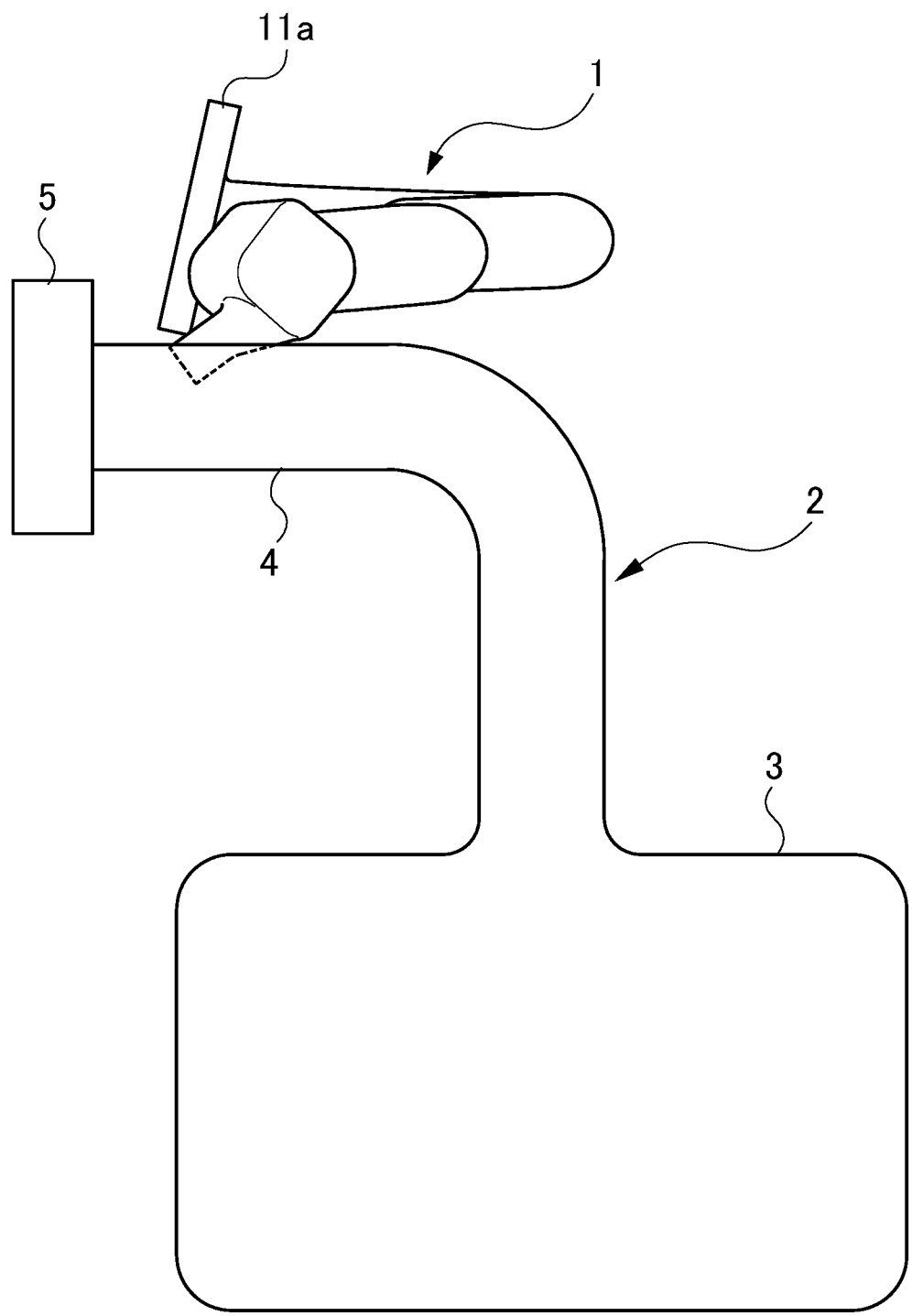
FIG. 1 is a schematic side view of an intake manifold provided with an EGR gas distributor in a first embodiment.

FIG. 1 is a schematic side view of an intake manifold 2 provided with an EGR gas distributor 1 in the first embodiment. Herein, the posture of the intake manifold 2 illustrated in FIG. 1 indicates the state of the intake manifold 2 when mounted in an engine of a vehicle so that the top and bottom of the intake manifold 2 are oriented as shown in FIG. 1. The intake manifold 2 is provided with a surge tank 3, a plurality of branch pipes 4 (only one is shown) branched off from the surge tank 3, and an outlet flange 5 for connection of outlets of the branch pipes 4 to the engine. In the present embodiment, the intake manifold 2 includes four branch pipes 4 adapted for a 4-cylinder engine.
(EGR Gas Distributor)

Figure 2:
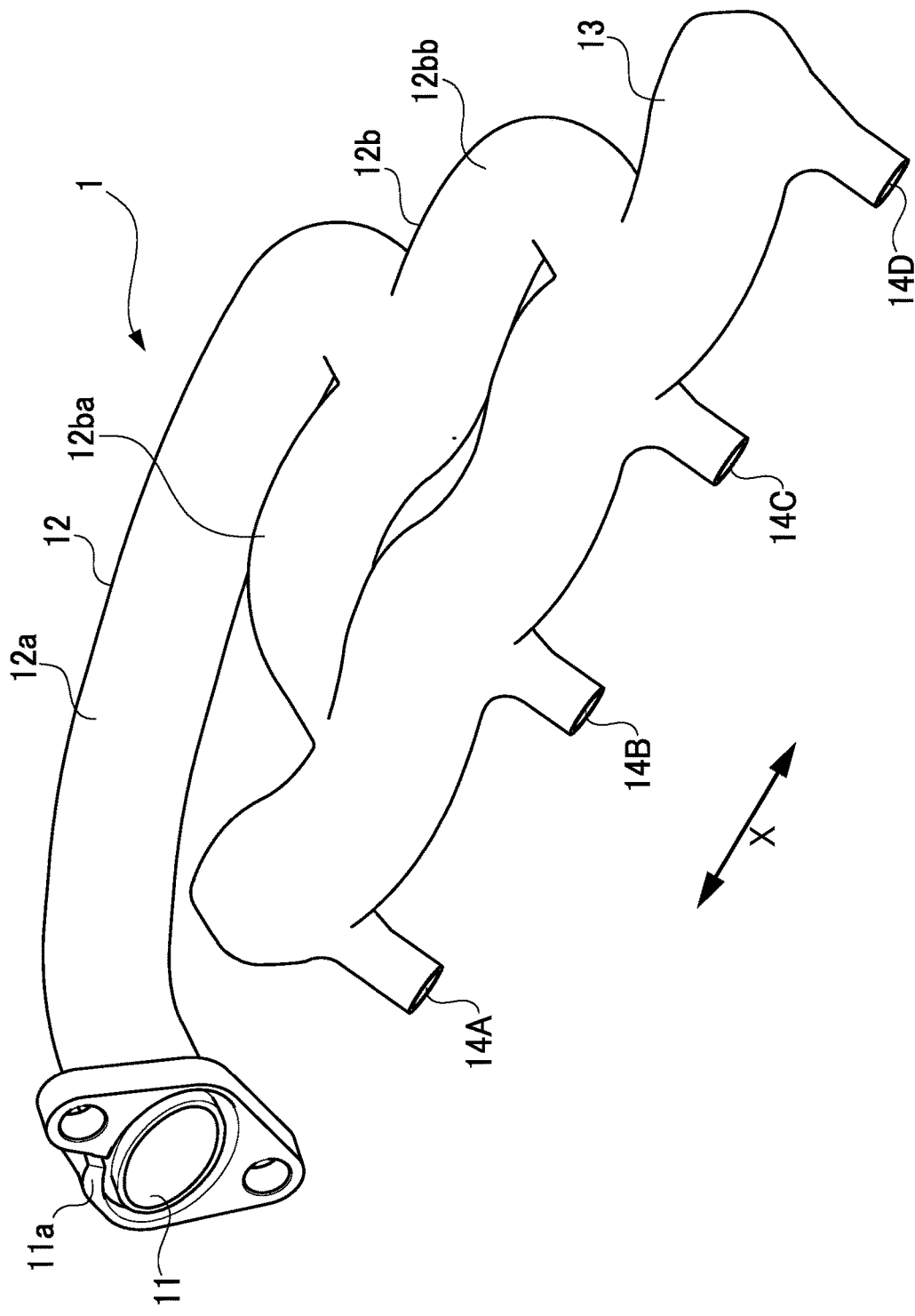
FIG. 2 is a perspective view of the EGR gas distributor seen from front in the first embodiment.
Figure 3:
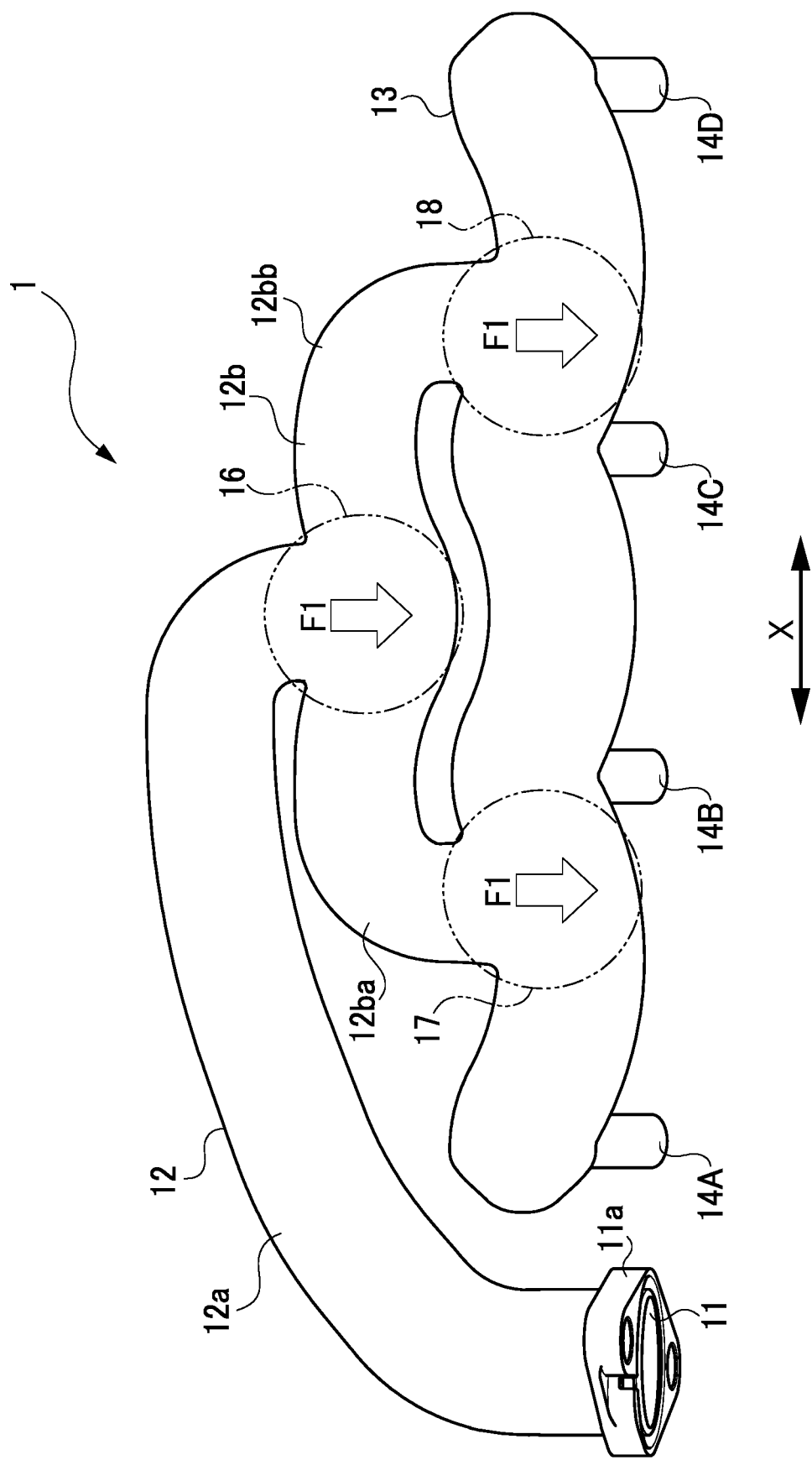
FIG. 3 is a plan view of the EGR gas distributor in the first embodiment.
Figure 4:
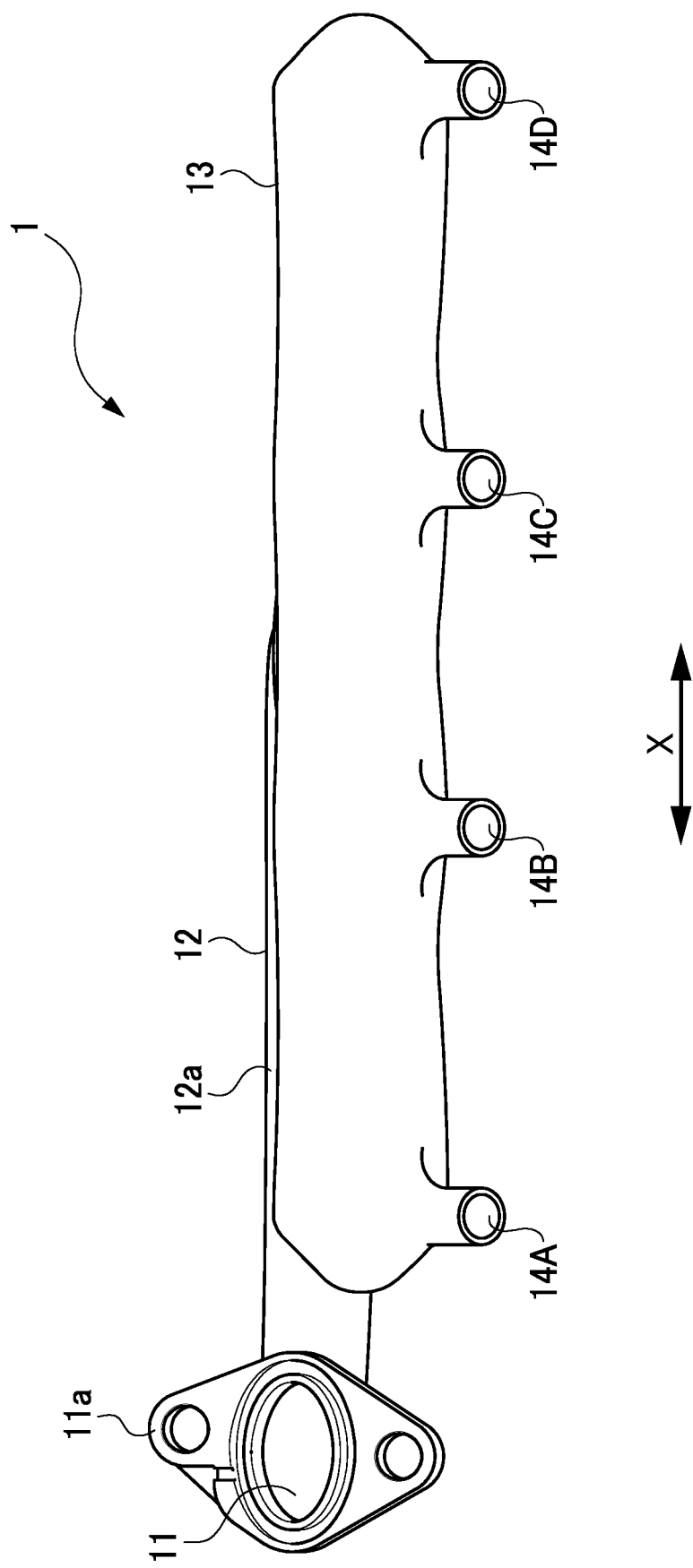
FIG. 4 is a front view of the EGR gas distributor in the first embodiment.
Figure 5:
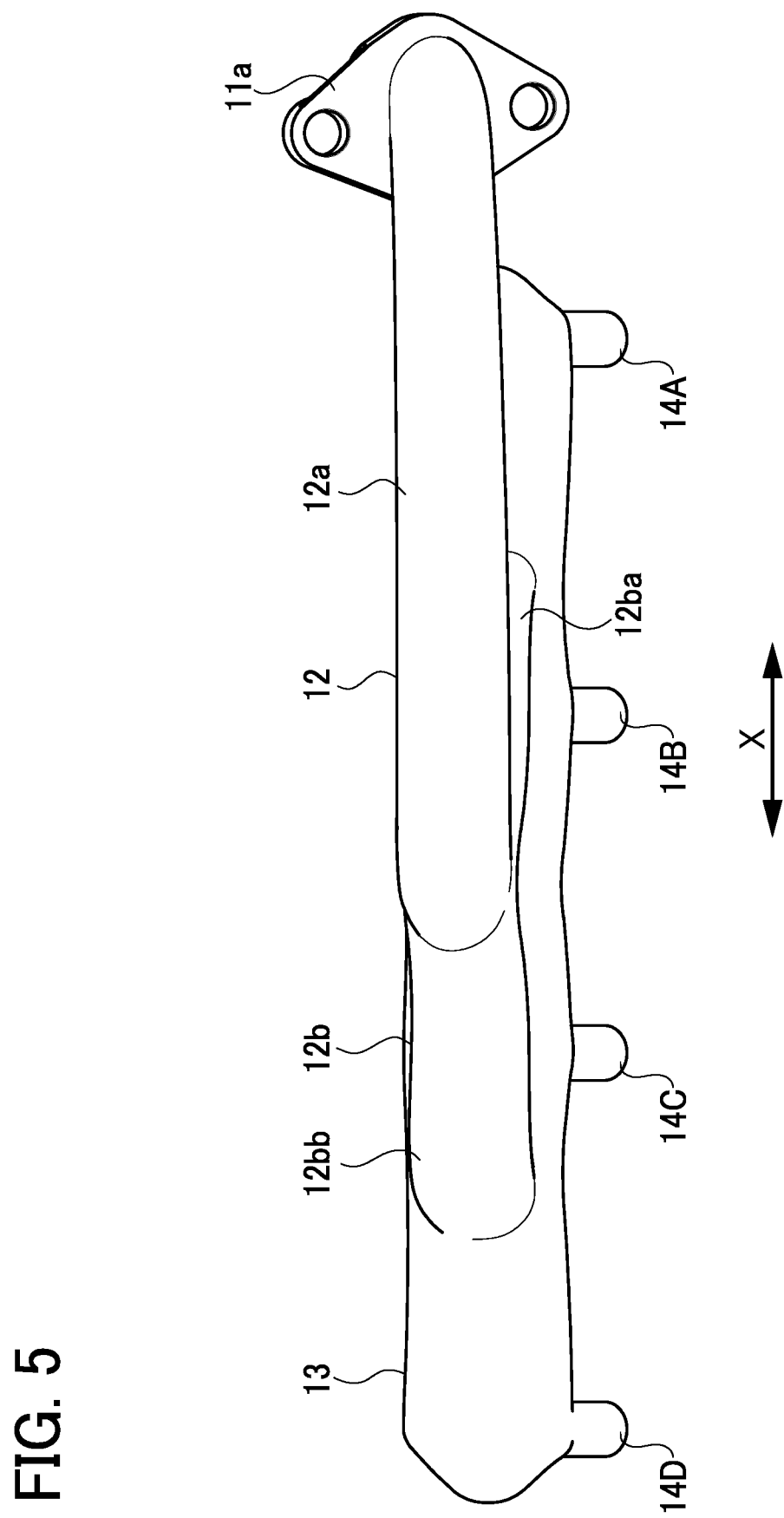
FIG. 5 is a back view of the EGR gas distributor in the first embodiment.
Figure 6:
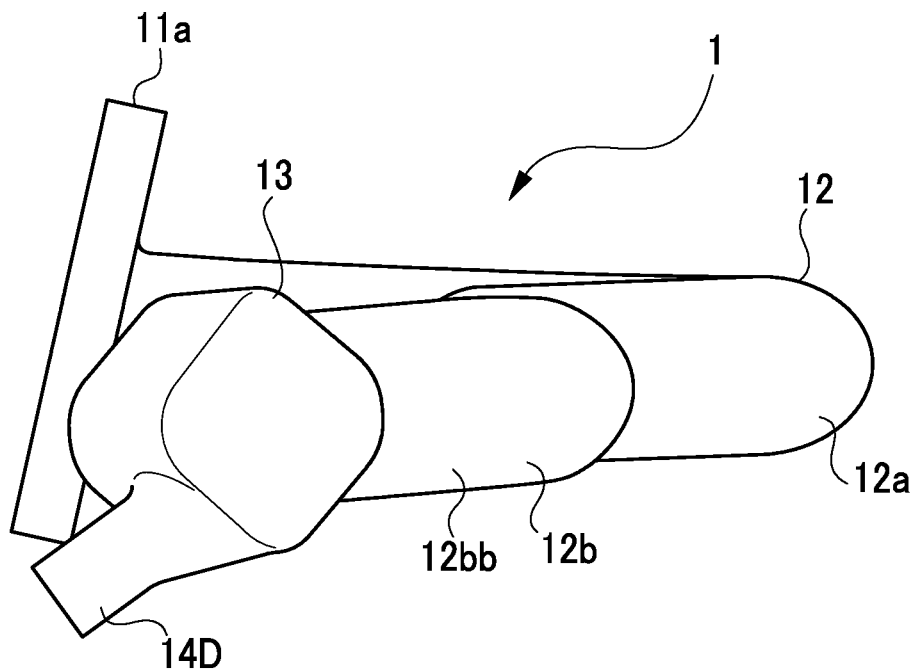
FIG. 6 is a right side view of the EGR gas distributor in the first embodiment.
Figure 7:
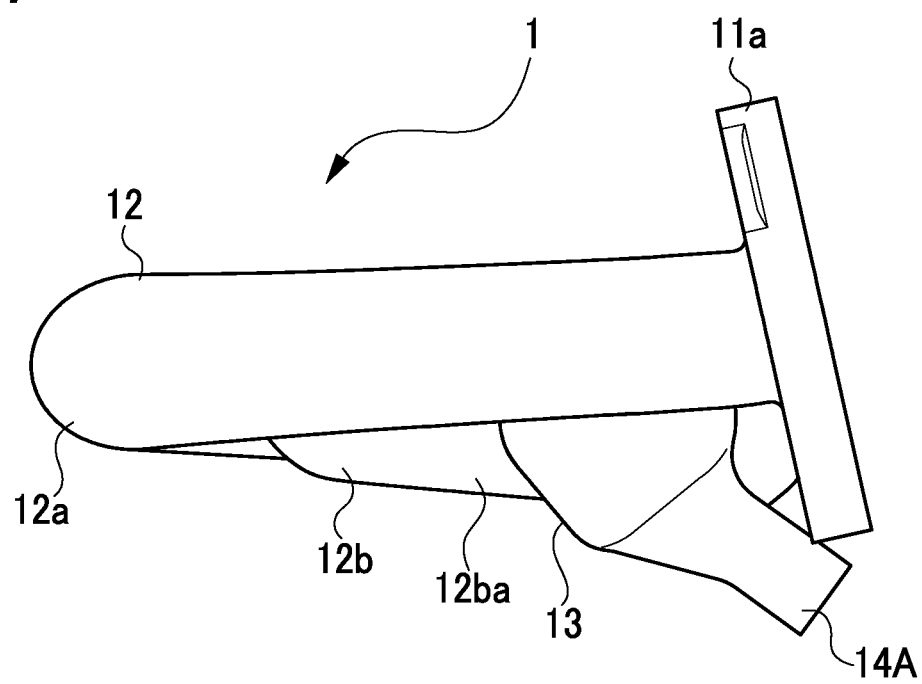
FIG. 7 is a left side view of the EGR gas distributor in the first embodiment.
Figure 8:
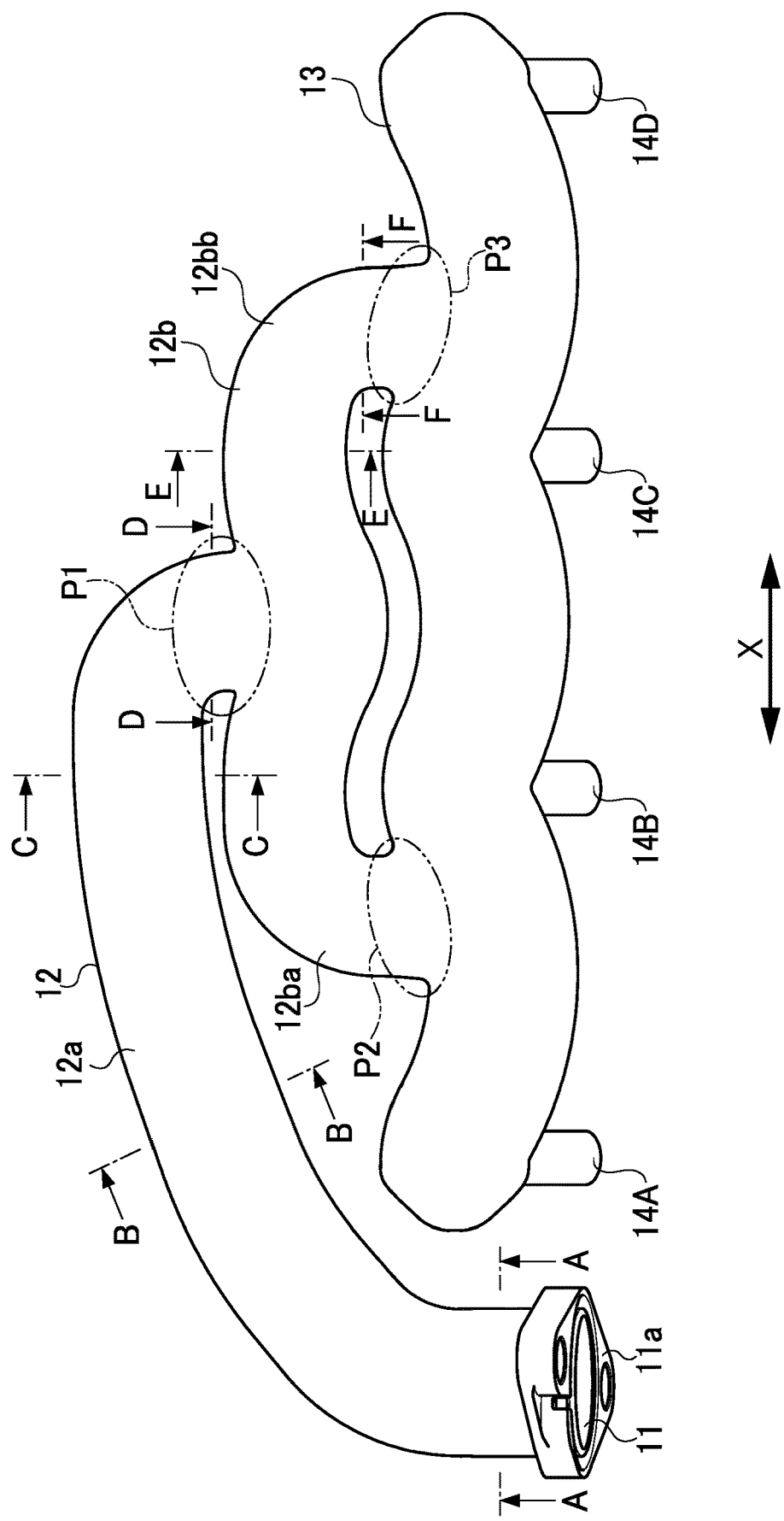
FIG. 8 is a plan view of the EGR gas distributor in the first embodiment.

In the present embodiment, as shown in FIG. 1, the EGR gas distributor 1 is placed near the outlet flange 5 and above the branch pipes 4 constituting the intake manifold 2 to distribute EGR gas to each of the branch pipes 4. FIG. 2 is a perspective view of the EGR gas distributor 1 seen from front. FIG. 3 is a plan view of the EGR gas distributor 1. FIG. 4 is a front view of the EGR gas distributor 1. FIG. 5 is a back view of the EGR gas distributor 1. FIG. 6 is a right side view of the EGR gas distributor 1. FIG. 7 is a left side view of the EGR gas distributor 1. FIG. 8 is a plan view of the EGR gas distributor 1. The outer shapes and configurations of the EGR gas distributor 1 and the intake manifold 2 shown in FIGS. 1 to 8 are merely one example of the present disclosure.

The EGR gas distributor 1 has a laterally long shape and is placed to extend across the plurality of branch pipes 4 of the intake manifold 2 in a longitudinal direction X of the EGR gas distributor 1 as shown in FIGS. 2 to 8. The EGR gas distributor 1 is produced in advance separately from the intake manifold 2 and then retrofitted onto the intake manifold 2. The EGR gas distributor 1 mainly includes three parts, that is, a gas inflow passage 12 including a gas inlet 11, a gas chamber 13 communicating with the gas inflow passage 12, and a plurality of gas distribution passages 14A, 14B, 14C, and 14D (four gas distribution passages in the present embodiment) branched off from the gas chamber 13 to communicate with the corresponding branch pipes 4. In this configuration, the gas chamber 13 has an inner diameter larger than that of the gas inflow passage 12, and each of the gas distribution passages 14A to 14D has an inner diameter smaller than those of the gas inflow passage 12 and the gas chamber 13. In the EGR gas distributor 1 in the present embodiment, the above components are integrally made of resin in one casing.

The gas inflow passage 12 is branched off in multiple stages to allow EGR gas to flow to the gas distribution passages 14A to 14D. EGR gas is introduced into the gas inlet 11. This gas inlet 11 is connected to an EGR passage (not shown). For this connection to the EGR passage, an inlet flange 11a is provided around the gas inlet 11. The gas inflow passage 12 includes a first gas passage part 12a extending from the gas inlet 11 and a second gas passage part 12b branched off in a bifurcated shape from the first gas passage part 12a. The second gas passage part 12b includes a first branch passage part 12ba and a second branch passage part 12bb. The gas inlet 11 opens on the front side of the EGR gas distributor 1. The first gas passage part 12a extends in a curve from the front side to the back side of the EGR gas distributor 1 and joins to the second gas passage part 12b. The gas chamber 13 has a tubular, laterally long shape. The gas chamber 13 serves to collect EGR gas introduced into the gas inflow passage 12 through the gas inlet 11. The plurality of gas distribution passages 14A to 14D are arranged side by side and in parallel with each other on the front of the gas chamber 13 and branched off from the gas chamber 13. In the present embodiment, each of the gas distribution passages 14A to 14D extends at a slant obliquely downward from the gas chamber 13 to the corresponding branch pipes 4 and opens therein in order to distribute EGR gas to the branch pipes 4.

In the present embodiment, as one example, the gas inflow passage 12 (including the first gas passage part 12a and the second gas passage part 12b) and the gas chamber 13 constitute a gas passage of the present disclosure. In the present embodiment, furthermore, the gas chamber 13 corresponds to one example of a final-stage gas passage part of the present disclosure. In the present embodiment, a downstream end of the first gas passage part 12a is connected to the second gas passage part 12b at a first joining portion (i.e., a circular portion enclosed by a two-dot chain line in FIG. 3) 16. A downstream end of the first branch passage part 12ba of the second gas passage part 12b is connected to the gas chamber 13 at a second joining portion (i.e., a circular portion enclosed by a two-dot chain line in FIG. 13) 17. Similarly, a downstream end of the second branch passage part 12bb is connected to the gas chamber 13 at a third joining portion (a circular portion enclosed by a two-dot chain line in FIG. 3) 18.

In the present embodiment, as shown in FIG. 3, paying attention to the first gas passage part 12a and the second gas passage part 12b, the second gas passage part 12b is placed so that a part of the second gas passage part 12b including the first joining portion 16 extends in an arrangement direction in which the gas distribution passages 14A to 14D are arranged, that is, in the longitudinal direction X, and further the first gas passage part 12a connects to the first joining portion 16 so as to perpendicular to the second gas passage part 12b. Furthermore, the part of the second gas passage part 12b including the first joining portion 16 has a curved shape convexly protruding in a flowing direction (indicated by an arrow) F1 of EGR gas flowing from the first gas passage part 12a. Herein, the direction F1 points in the same direction as the extending direction of each of the gas distribution passages 14A to 14D. Thus, the part of the second gas passage part 12b extending in the longitudinal direction X has a shape bent in a substantially zigzag form in plan view.

As shown in FIG. 3, furthermore, paying attention to the second gas passage part 12b and the gas chamber 13, the gas chamber 13 is placed so that a part of the gas chamber 13 including the second joining portion 17 and the third joining portion 18 extends in the longitudinal direction X and further the first branch passage part 12ba of the second gas passage part 12b connects to the second joining portion 17 and the second branch passage part 12bb of the second gas passage part 12b connects to the third joining portion 18 respectively so as to be perpendicular to the gas chamber 13. The part of the gas chamber 13 including the second joining portion 17 and the third joining portion 18 has a curved shape convexly protruding in the flowing direction F1 of EGR gas from respective branch passage parts 12ba and 12bb. Thus, the entire gas chamber 13 has a shape bent in a substantially zigzag form in plan view.

(Configuration for Natural Downward Flow of Condensed Water)

Figure 9:
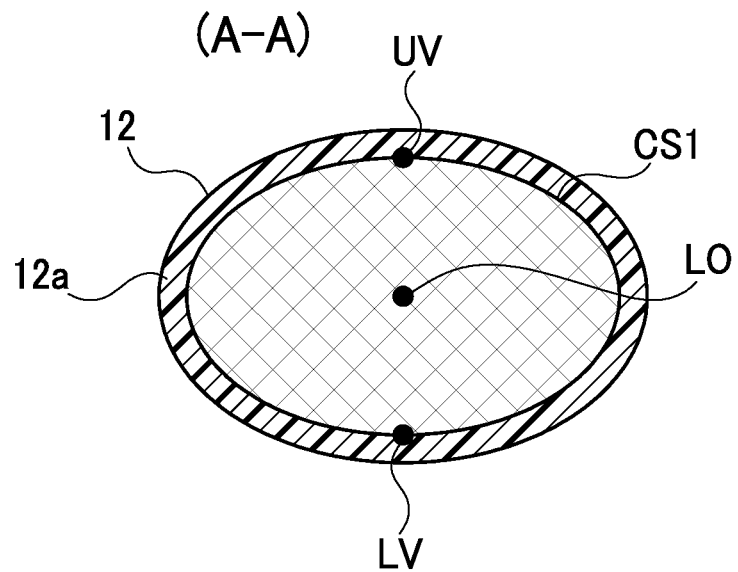
FIG. 9 is an A-A cross-sectional view of a gas inflow passage in FIG. 8 in the first embodiment.
Figure 10:
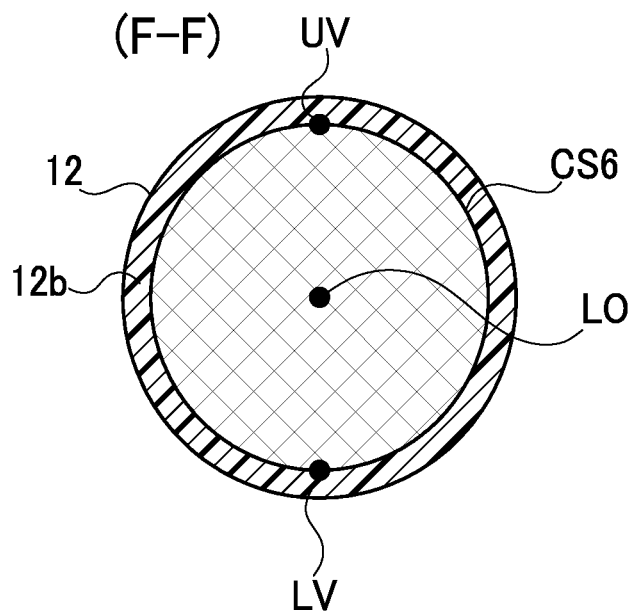
FIG. 10 is an F-F cross-sectional view of the gas inflow passage in FIG. 8 in the first embodiment.

The EGR gas distributor 1 in the present embodiment is provided with the following configuration in order to allow condensed water to naturally flow down. FIG. 9 is an A-A cross-sectional view of the gas inflow passage 12 (i.e., the first gas passage part 12a) in FIG. 8. FIG. 10 is an F-F cross-sectional view of the gas inflow passage 12 (i.e., the second gas passage part 12b (concretely, the second branch passage part 12bb)) in FIG. 8. In the present embodiment, when the EGR gas distributor 1 is mounted on the intake manifold 2 as shown in FIG. 1, a passage cross-section CS1 of the first gas passage part 12a and a passage cross-section CS6 of the second gas passage part 12b that are each taken perpendicular to the central axis L0 of each passage part 12a and 12b and indicated by lattice hatching have a shape including an uppermost vertex UV and a lowermost vertex LV in at least a portion as shown in FIGS. 9 and 10. In the present embodiment, specifically, the passage cross-section CS1 shown in FIG. 9 has an elliptic shape and the passage cross-section CS6 shown in FIG. 10 has a substantially circular shape. The first gas passage part 12a and the second gas passage part 12b each have an inner wall defining the outer shapes of the passage cross-sections CS1 and CS6 and including a valley line. The lowermost vertex LV corresponds to the valley line of the inner wall. An upper half (i.e., an upper-side surface of the inner wall) of each of the passage cross-sections CS1 and CS6 is curved downward from the uppermost vertex UV and a lower half (i.e., a lower-side surface of the inner wall) of each of the passage cross-sections CS1 and CS6 is curved upward from the lowermost vertex LV.

Figure 11:
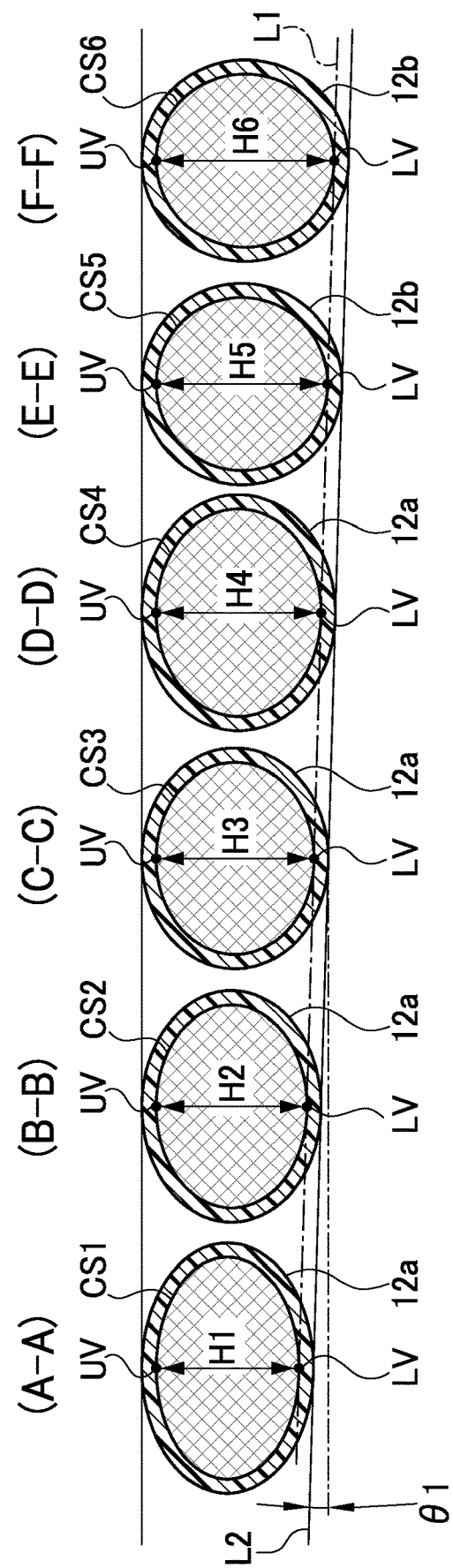
FIG. 11 is a conceptual diagram showing different cross-sectional views of the gas inflow passage in FIG. 8, i.e., the A-A cross-sectional view, a B-B cross-sectional view, a C-C cross-sectional view, a D-D cross-sectional view, an E-E cross-sectional view, and the F-F cross-sectional view, sequentially arranged from left to right, in the first embodiment.

FIG. 11 is a conceptual diagram showing different cross-sectional views of the gas inflow passage 12 in FIG. 8; namely, an A-A cross-sectional view (A-A), a B-B cross-sectional view (B-B), a C-C cross-sectional view (C-C), a D-D cross-sectional view (D-D), an E-E cross-sectional view (E-E), and an F-F cross-sectional view (F-F), sequentially arranged from left to right. In FIG. 11, the passage cross-sections CS1, CS2, CS3, CS4, CS5, and CS6 in the cross-sectional views (A-A, B-B, C-C, D-D, E-E, and F-F) are illustrated with lattice hatching, and their lengths from the uppermost vertex UV to the lowermost vertex LV, that is, the lengths of the passage cross-sections CS1 to CS6 in the vertical direction are respectively indicated by H1, H2, H3, H4, H5, and H6.

In the EGR gas distributor 1 in the present embodiment, as shown in FIG. 11, the passage cross-sections CS1 to CS6 of the gas inflow passage 12 (i.e., the first gas passage part 12a and the second gas passage part 12b) excepting the gas chamber 13 (i.e., the final-stage gas passage part) are sized such that respective lengths H1 to H6 in the vertical direction are different* so as to be gradually longer from an upstream toward a downstream side of the first gas passage part 12a, from an upstream toward a downstream side of the second gas passage part 12b, and further from the upstream side of the first gas passage part 12a toward the downstream side of the second gas passage part 12b, that is, longer as being closer to a downstream side. Herein, the areas of the passage cross-sections CS1 to CS6 are set to be equal to each other. With this configuration, when the EGR gas distributor 1 is mounted on the intake manifold 2, the gas passage parts 12a and 12b each have a shape whose valley line of the inner wall including the lowermost vertex LV (indicated by a two-dot chain line L1 in FIG. 11) is inclined downward toward a flowing direction of EGR gas at a predetermined angle θ1 with respect to a horizontal line. In the present embodiment, the thickness of a casing defining the gas passage parts 12a and 12b is uniform over all portions. Thus, the angle θ1 of the valley line with respect to the horizontal line is equal to an angle θ1 with respect to a ridge line (indicated by a solid line L2 in FIG. 11) including a lowermost point of each of the passage cross-sections CS1 to CS6 shown in FIG. 11. In the present embodiment, as shown FIGS. 1, 3, and 8, the EGR gas distributor 1 is mounted so that the gas inflow passage 12 is arranged side by side with the gas chamber 13 in the horizontal direction (Horizontal mounting). In this manner, when the EGR gas distributor 1 is horizontally mounted, the valley line (indicated by the two-dot chain line L1 in FIG. 11) of the inner walls of the gas passage parts 12a and 12b is inclined downward. Accordingly, the EGR gas distributor 1 can be designed such that each of the passage cross-sections CS1 to CS5 on the inlet side is elliptic and each passage cross-section CS6 on the outlet side is circular.

(Operations and Effects of the EGR Gas Distributor)

According to the EGR gas distributor 1 configured as above in the present embodiment, the EGR gas introduced into the gas inflow passage 12 through the gas inlet 11 flows through the gas inflow passage 12 by splitting into multiple streams and then collect in the gas chamber 13, and further is distributed to the plurality of branch pipes 4 of the intake manifold 2 through the plurality of gas distribution passages 14A to 14D. Herein, when the EGR gas distributor 1 is mounted on the intake manifold 2, the shape of each of the passage cross-sections CS1 to CS6 taken perpendicular to the central axis L0 of the gas inflow passage 12 (the gas passage) has the uppermost vertex UV and the lowermost vertex LV in the inner wall. Accordingly, condensed water generated in the gas inflow passage 12 naturally flows downward without staying or accumulating on the upper side of the inner wall and thus collects on the lower side of the inner wall centered on the lowermost vertex LV. Consequently, the EGR gas distributor 1 can facilitate natural downward flow of condensed water in each of the gas passage parts 12a and 12b (the gas passage) without particularly increasing the size of the EGR gas distributor 1.

According to the configuration of the present embodiment, the passage cross-sections CS1 to CS6 of the gas passage parts 12a and 12b (the gas passage excepting the final-stage gas passage part) are sized such that respective lengths H1 to H6 in the vertical direction (also referred to as "vertical length") of the gas passage parts 12a and 12b are different to be gradually longer from one on an upstream side to one on a downstream side, i.e., longer as being closer to a downstream side. Thus, the vertical length H6 of the passage cross-section CS6 on a most downstream side of the gas passage parts 12a and 12b is assumed as an upper limit of the length and the lowermost point of the vertical length H1 of the passage cross-section CS1 on a most upstream side of the gas passage parts 12a and 12b is assumed as a reference of the inclination. As the lowermost points of the passage cross-sections CS2 to CS6 in the vertical lengths H2 to H6 changing from upstream to downstream are located to be gradually lower, the lower inner walls of the gas passage parts 12a and 12b are sloped in the flowing direction of EGR gas even in the limited space. The thus configured EGR gas distributor 1 allows condensed water to easily naturally flow downward in the flowing direction of EGR gas through the gas passage parts 12a and 12b without the need to particularly increase the size of the EGR gas distributor 1.

According to the present embodiment configured as above, almost all of the passage cross-sections CS1 to CS6 of the gas passage parts 12a and 12b are circular and elliptic. Thus, the circumferential length per area of each of the passage cross-sections CS1 to CS6 of the gas passage parts 12a and 12b is shorter than a configuration that each passage cross-section is rectangular, so that EGR gas is less likely to be cooled by outside air through the inner walls of the gas passage parts 12a and 12b. This can reduce the amount of condensed water to be generated on the inner walls of the gas passage parts 12a and 12b.

According to the present embodiment configured as above, each of the gas passage parts 12a and 12b is designed with a shape whose valley line of the inner wall including the lowermost vertex LV in each of the passage cross-sections CS1 to CS6 is inclined downward in the flowing direction of EGR gas. This configuration allows the condensed water in the gas passage parts 12a and 12b to easily naturally flow downward in the flowing direction of EGR gas along the valley line of the inner wall. Furthermore, the gas chamber 13 and the gas distribution passages 14A to 14D each have the shape inclined downward in the flowing direction of EGR gas. This configuration allows the condensed water in the gas chamber 13 and the gas distribution passages 14A to 14D to easily naturally flow downward in the flowing direction of EGR gas. Consequently, the gas passage parts 12a and 12b, the gas chamber 13, and the gas distribution passages 14A to 14D can achieve enhanced drainage performance to drain condensed water in the flowing direction of EGR gas.

According to the present embodiment configured as above, the final-stage gas passage part is constituted of the gas chamber 13, so that the amount of EGR gas necessary for distribution collects once in the gas chamber 13 and then the EGR gas is distributed to the gas distribution passages 14A to 14D. This configuration can distribute EGR gas to the gas distribution passages 14A to 14D without excess or deficiency.

According to the present embodiment configured as above, the gas inflow passage 12 is designed such that the first gas passage part 12a connects to the first joining portion 16 so as to be perpendicular to the second gas passage part 12b. Further, a part of the second gas passage part 12b including the first joining portion 16 has a curved shape convexly protruding in the flowing direction of EGR gas flowing from the first gas passage part 12a. Similarly, the second gas passage part 12b (i.e., the first branch passage part 12ba and the second branch passage part 12bb) connects to the second joining portion 17 and the third joining portion 18 so as to be perpendicular to the gas chamber 13. Further, a part of the gas chamber 13 including the second joining portion 17 and the third joining portion 18 has a curved shape convexly protruding in the flowing direction of EGR gas flowing from the second gas passage part 12b. In the curved portion of the second gas passage part 12b convexly protruding as above, as shown in FIG. 8, a first portion P1 connected to a downstream end of the first gas passage part 12a is recessed, so that the first gas passage part 12a has an increased passage length by just that much. Similarly, In the curved portions of the gas chamber 13 convexly protruding as above, a second portion P2 and a third portion P3 connected to downstream ends of the second gas passage part 12b are recessed, so that the second gas passage part 12b (i.e., the first branch passage part 12ba and the second branch passage part 12bb) has an increased passage length by just that much. Accordingly, the EGR gas distributor 1 can effectively rectify EGR gas through the gas inflow passage 12 and the gas chamber 13 without the need to increase the size of the EGR gas distributor 1, thus enhancing distributivity of EGR gas. In addition, as compared with the conventional EGR gas distributor, the EGR gas distributor 1 in the present embodiment can exert a secondary effect that reduces pressure loss of EGR gas.

Second Embodiment

A second embodiment of the EGR gas distributor will be described with reference to accompanying drawings. In the following description, similar or identical parts to those in the first embodiment will be assigned the same reference signs as in the first embodiment without repeating the details thereof, and differences from the first embodiment will be focused.

Figure 12:
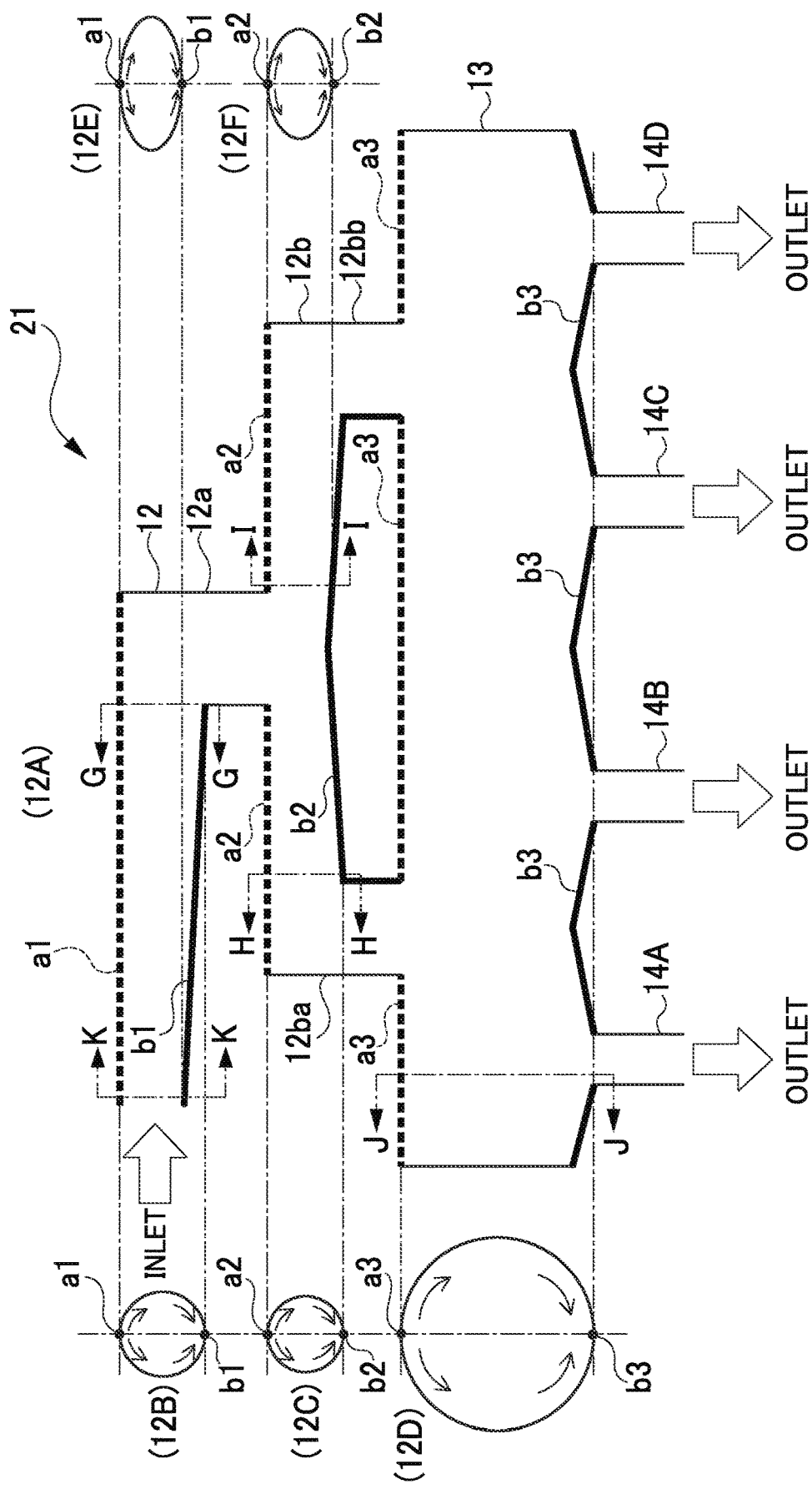
FIG. 12 is a conceptual diagram showing a dimensional relationship of passage cross-sections of a gas inflow passage and a gas chamber in a second embodiment.

The second embodiment differs from the first embodiment in the entire structure of an EGR gas distributor 21. In the second embodiment, the EGR gas distributor 21 is mounted so that the gas inflow passage 12 is arranged side by side with the gas chamber 13 in a vertical direction (Vertical mounting). FIG. 12 is a conceptual diagram showing a dimensional relationship of passage cross-sections of the gas inflow passage 12 and the gas chamber 13 of the EGR gas distributor 21 in the second embodiment. In FIG. 12, (12A) is a front view of a gas passage part of the EGR gas distributor 21 illustrating an inner schematic shape; (12B) is a G-G cross-sectional view in the front view (12A); (12C) is an H-H cross-sectional view in the front view (12A); (12D) is a J-J cross-sectional view in the front view (12A); (12E) is a K-K cross-sectional view in the front view (12A); and (12F) is an I-I cross-sectional view in the front view (12A). Those views (12A) to (12F) are illustrated in a single drawing for mutual comparison.

In the present embodiment, in the front view (12A), a lower-surface bottom line b1 of the first gas passage part 12a, a lower-surface bottom line b2 of the second gas passage part 12b, and a lower-surface bottom line b3 of the gas chamber 13, which are illustrated with thick solid lines in this embodiment, are inclined downward from an inlet of the first gas passage part 12a to each outlet of the gas distribution passages 14A to 14D. This inclination of each of the lower-surface bottom lines b1 to b3 allows condensed water to collect in large water droplets on the lower-surface bottom lines b1 to b3. Accordingly, even if the inclination angle θ1 (see FIG. 11) is small, the condensed water is allowed to easily naturally flow down toward the outlets of the gas distribution passages 14A to 14D.

In the front view (12A), in contrast, an upper-surface top line a1 of the first gas passage part 12a, an upper-surface top line a2 of the second gas passage part 12b, and an upper-surface top line a3 of the gas chamber 13, which are illustrated with thick broken lines in this embodiment, are horizontal, not inclined from the inlet of the first gas passage part 12a toward the outlets of the gas distribution passages 14A to 14D. With such a horizontal configuration, the upper-surface top lines a1 to a3 are not located apart from the intake manifold 2 beyond necessity and can suppress deterioration in vehicle-mounting property of the EGR gas distributor 21. Furthermore, some of the passage cross-sections of the EGR gas distributor 21 can be designed in a flattened shape, so that both enhancing of the vehicle-mounting property and ensuring of the passage cross-sectional area can be achieved. As alternative examples, the upper-surface top lines a1 and a2 may be inclined downward or upward from an upstream to a downstream side of the first gas passage part 12a and the second gas passage part 12b, respectively. The upper-surface top line a3 may also be inclined downward or upward with respect to the gas distribution passages 14A to 14D.

In the present embodiment, in each of the cross-sectional views (12B) to (12F), the inner surfaces of the upper halves of the first gas passage part 12a, the second gas passage part 12b, and the gas chamber 13 and the inner surfaces of the lower halves of the first gas passage part 12a, the second gas passage part 12b, and the gas chamber 13 are inclined, or curved, toward the corresponding lower-surface bottom lines b1 to b3. Such the inclined (curved) inner surfaces of the upper and lower halves allow the condensed water generated in the EGR gas distributor 21 to easily naturally flow downward without staying on the upper surfaces.

In the present embodiment, furthermore, as shown in the cross-sectional view (12E) and the cross-sectional view (12B), the first gas passage part 12a has an elliptic passage cross-section on an upstream side, a circular passage cross-section on a downstream side, and an intermediate passage cross-section that gradually changes from an elliptic to a circular shape. Similarly, as shown in the cross-sectional view (12F) and the cross-sectional view (12C), the second gas passage part 12b has an elliptic passage cross-section on an upstream side, a circular passage cross-section on a downstream side, and an intermediate passage cross-section that gradually changes from an elliptic to a circular shape. In the present embodiment, still further, as is clear from comparison between the cross-sectional view (12B) and the cross-sectional view (12C) and between the cross-sectional view (12E) and the cross-sectional view (12F), the area of the passage cross-section of the first gas passage part 12a is set larger than the area of the passage cross-section of the second gas passage part 12b. This setting is adoptable because the total rate of EGR gas flowing through the first gas passage part 12a is split into two streams to flow in the second gas passage part 12b. This configuration enables a reduction in area of passage cross-sections of the second gas passage part 12b, so that the surface area of the entire inner wall of the gas inflow passage 12 can be reduced and hence the amount of condensed water to be generated in the gas inflow passage 12 can also be decreased.

(Operations and Effects of the EGR Gas Distributor)

The EGR gas distributor 21 configured as above in the second embodiment can provide the same operations and effects as those in the first embodiment.

The foregoing embodiments are mere examples and give no limitation to the present disclosure. The present disclosure may be embodied in other specific forms without departing from the essential characteristics thereof.

Figure 13:
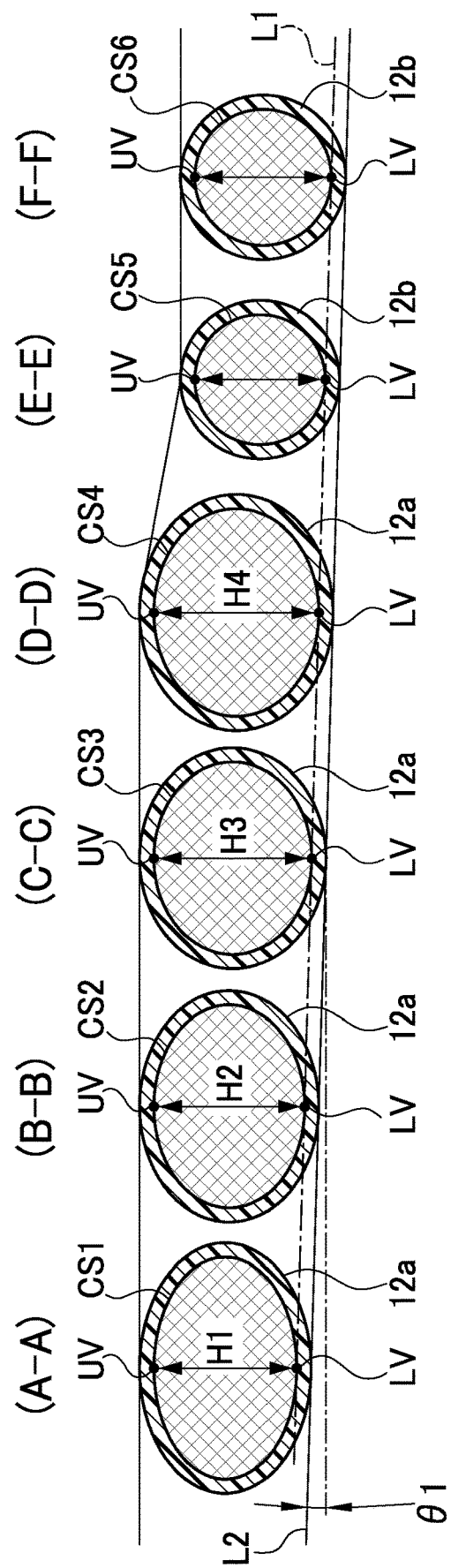
FIG. 13 is a conceptual diagram of a gas inflow passage, corresponding to FIG. 11, in another embodiment.

(1) In the first embodiment, as shown in FIG. 11, the passage cross-sections CS1 to CS6 are set equal in area to each other. In contrast, another configuration may be adapted as shown in FIG. 13 illustrating a conceptual diagram of a gas inflow passage, corresponding to FIG. 11, in which the passage cross-sections CS1 to CS4 are set equal in area to each other and the passage cross-sections CS5 and CS6 are set equal in area to each other and smaller than the area of each of the passage cross-sections CS1 to CS4. In this case, the lowermost vertex LV of each of the passage cross-sections CS1 to CS6 is also aligned with the valley line (the two-dot chain line L1 in FIG. 13) of the inner wall. This configuration also enables a reduction in area of passage cross-sections of the second gas passage part 12b, so that the surface area of the entire inner wall of the gas inflow passage 12 can be reduced and hence the amount of condensed water to be generated in the gas inflow passage 12 can also be decreased.

Figure 14:
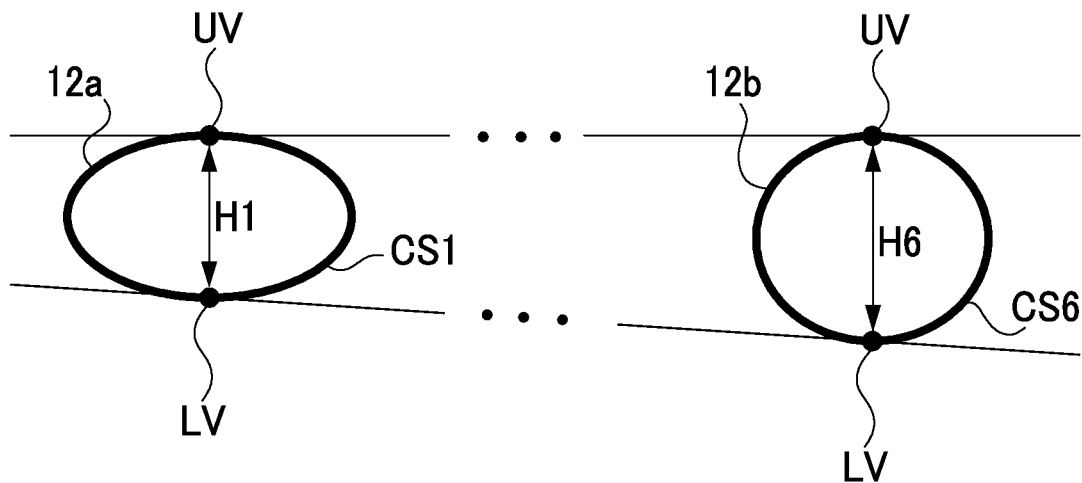
FIG. 14 is a conceptual diagram, corresponding to FIG. 11, showing cross-sectional views of the gas inflow passage side by side in the first embodiment.
Figure 15:
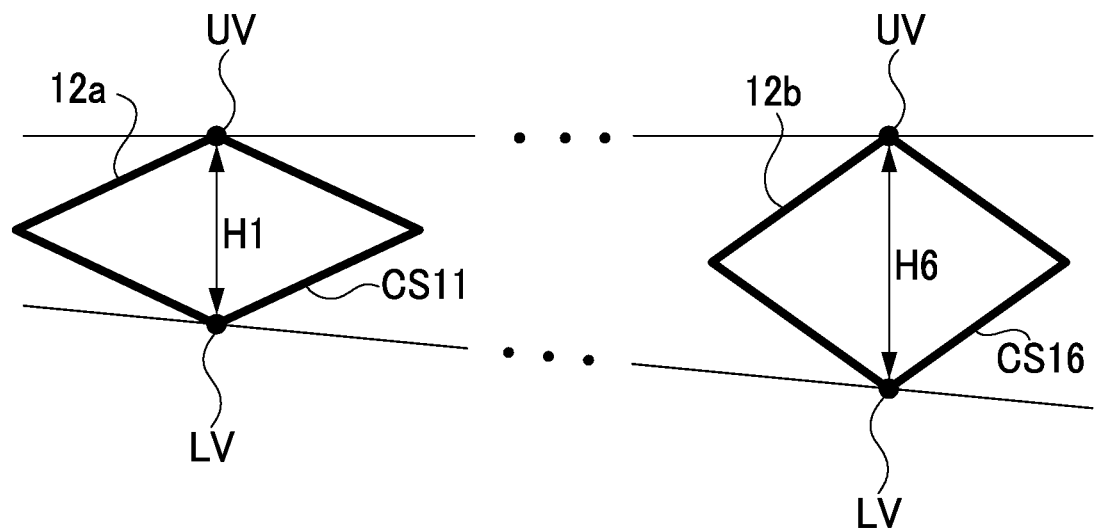
FIG. 15 is a conceptual diagram, corresponding to FIG. 11, showing cross-sectional views of the gas inflow passage side by side in another embodiment.

(2) In each of the foregoing embodiments, as shown in FIG. 14 illustrating a conceptual diagram corresponding to FIG. 11, the gas passage parts 12a and 12b are configured such that the passage cross-sections CS1 to CS6 are elliptic in shape with vertical lengths H1 to H6 that are gradually longer from an upstream side to a downstream side of each of the gas passage parts 12a and 12b. As an alternative, as shown in FIG. 15 illustrating a conceptual diagram corresponding to FIG. 11, the gas passage parts 12a and 12b may be configured such that passage cross-sections CS11 to CS16 are rhombic in shape with vertical lengths H1 to H6 that are gradually longer from an upstream side to a downstream side of each of the gas passage parts 12a and 12b. In this case, preferably, each angle of the rhombus cross-section is not acute.

Figure 16:
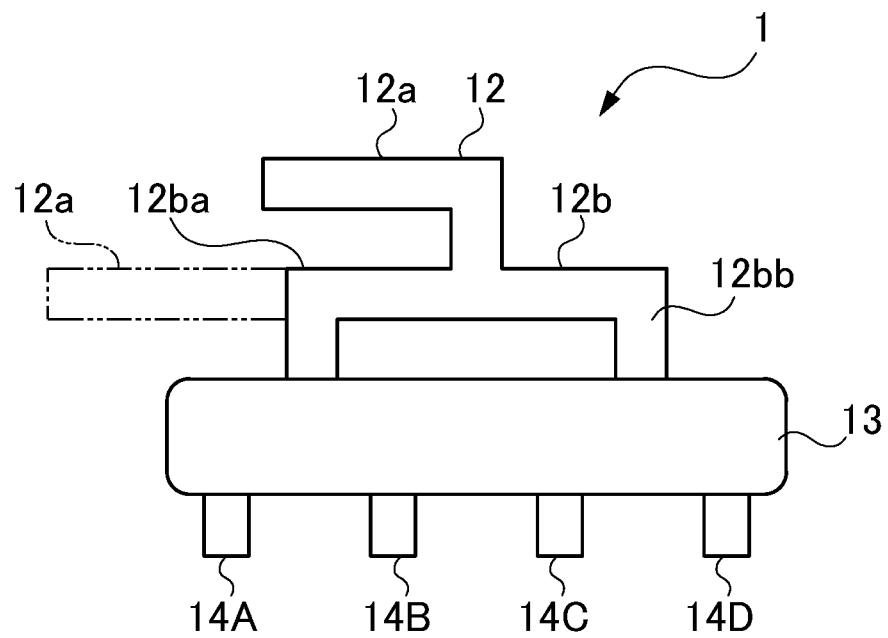
FIG. 16 is a plan view of the EGR gas distributor in the first embodiment.
Figure 17:
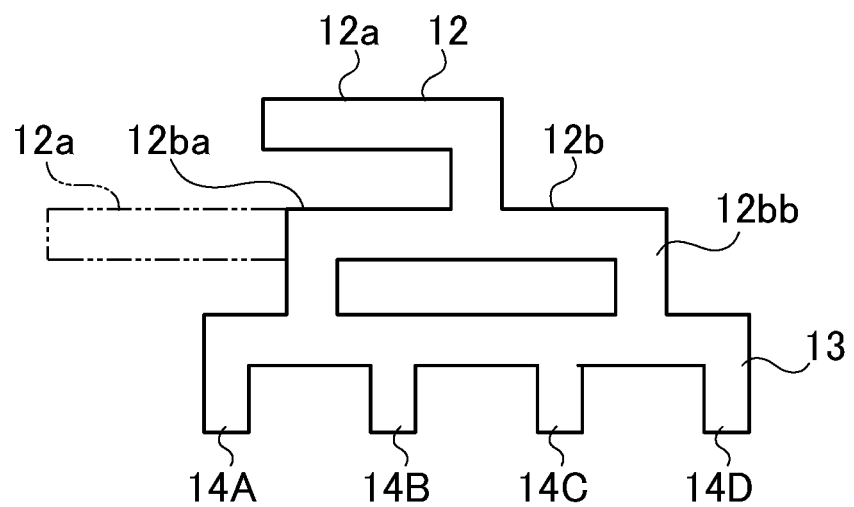
FIG. 17 is a plan view of an EGR gas distributor in another embodiment.

(3) In each of the foregoing embodiments, the EGR gas distributor 1 is made up of the gas inflow passage 12 (including the first gas passage part 12a and the second gas passage part 12b branched off in a bifurcated shape from the first gas passage part 12a), the single gas chamber 13 (having the inner diameter larger than the inner diameter of the gas inflow passage 12), and four gas distribution passages 14A to 14D (each having the inner diameter smaller than the inner diameter of the gas inflow passage 12 and the inner diameter of the gas chamber 13), as shown in FIG. 16 illustrating a plan view. As an alternative, as shown in FIG. 17 illustrating an EGR gas distributor in a plan view, the gas chamber 13 and each of the gas distribution passages 14A to 14D may be designed with the same inner diameter as the gas inflow passage 12. Further, as indicated by a two-dot chain line in FIGS. 16 and 17, the first gas passage part 12a may be connected to one end side of the second gas passage part 12b, instead of the center of the second gas passage part 12b.

(4) In each of the foregoing embodiments, the EGR gas distributor 1 is made up of the gas inflow passage 12 (including the first gas passage part 12a and the second gas passage part 12b branched off in a bifurcated shape from the first gas passage part 12a), the single gas chamber 13

Figure 18:
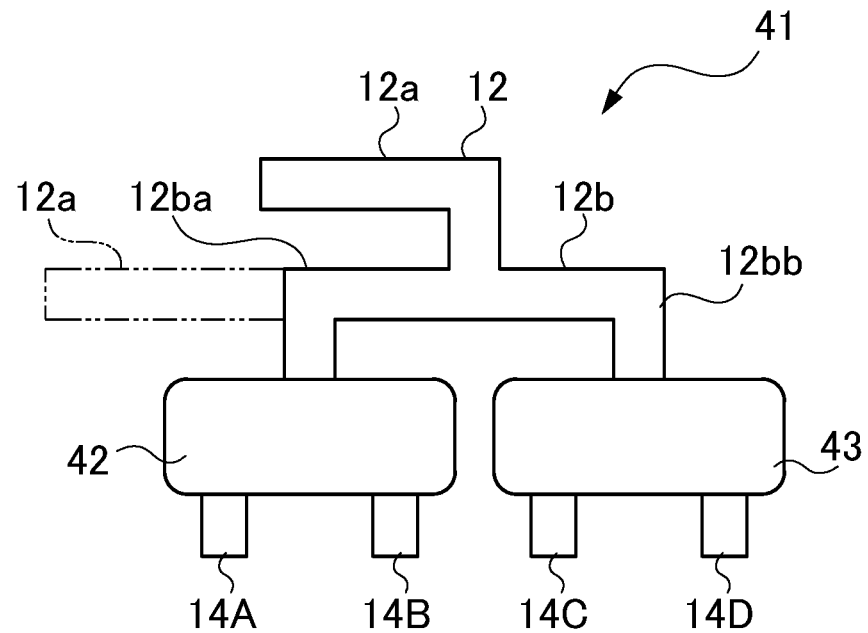
FIG. 18 is a plan view of an EGR gas distributor in another embodiment.

(having the inner diameter larger than the inner diameter of the gas inflow passage 12), and four gas distribution passages 14A to 14D (each having the inner diameter smaller than the inner diameter of the gas inflow passage 12 and the inner diameter of the gas chamber 13), as shown in FIG. 16 illustrating a plan view. As an alternative thereto, as shown in FIG. 18 illustrating an EGR gas distributor 41 in a plan view, the EGR gas distributor 41 may be made up of the gas inflow passage 12 (including the first gas passage part 12a and the second gas passage part 12b branched off in a bifurcated shape from the first gas passage part 12a), two gas chambers 42 and 43 (each having an inner diameter larger than the inner diameter of the gas inflow passage 12), and four gas distribution passages 14A to 14D (each having the inner diameter smaller than the inner diameter of the gas inflow passage 12 and the inner diameter of the gas chambers 42 and 43), in which the gas passage has a tournament branch shape extending from an inlet of the gas passage to the plurality of gas distribution passages 14A to 14D. Further, as indicated by a two-dot chain line in FIG. 18, the first gas passage part 12a may be connected to one end side of the second gas passage part 12b, instead of the center of the second gas passage part 12b.

Figure 19:
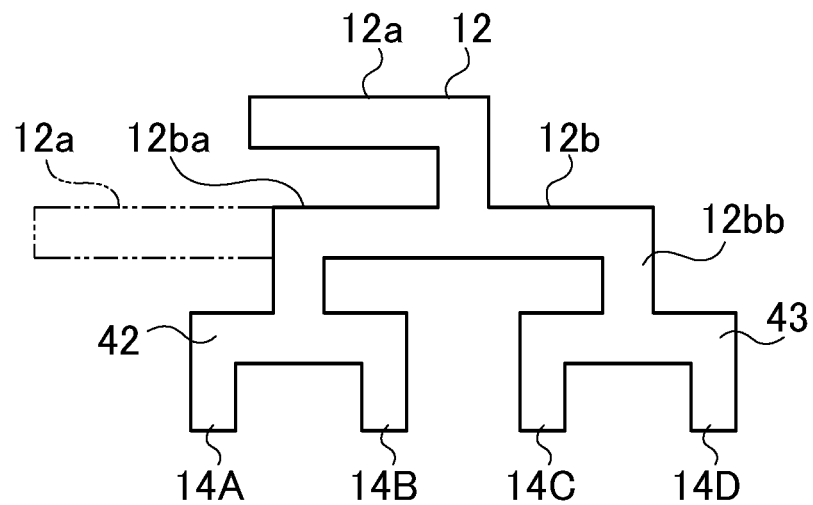
FIG. 19 is a plan view of an EGR gas distributor in another embodiment.

(5) In the above-described alternative embodiment (4), as shown in FIG. 18 illustrating a plan view, the EGR gas distributor 41 is made up of the gas inflow passage 12 (including the first gas passage part 12a and the second gas passage part 12b branched off in a bifurcated shape from the first gas passage part 12a), the two gas chambers 42 and 43 (each having the inner diameter larger than the inner diameter of the gas inflow passage 12), and four gas distribution passages 14A to 14D (each having the inner diameter smaller than the inner diameter of the gas inflow passage 12 and the inner diameter of the gas chambers 42 and 43), in which the gas passage has a tournament branch shape. As an alternative thereto, as shown in FIG. 19 illustrating an EGR gas distributor in a plan view, each of the gas chambers 42 and 43 and each of the gas distribution passages 14A to 14D may be designed with the same inner diameter as the gas inflow passage 12. In addition, as indicated by a two-dot chain line in FIG. 19, the first gas passage part 12a may be connected to one end side of the second gas passage part 12b, instead of the center of the second gas passage part 12b. In this configuration, in which the gas passage has a tournament branch shape, therefore, the EGR gas entering through the inlet is uniformly split in a stepwise manner through the gas passage and distributed to the gas distribution passages 14A to 14D. Accordingly, the EGR gas can be distributed evenly to the gas distribution passages 14A to 14D.

(6) In the foregoing alternative embodiment (3), the gas inflow passage 12 is configured to branch off in two stages toward four gas distribution passages 14A to 14D as shown in FIG. 17 illustrating the EGR gas distributor in the plan view. As another alternative thereto, as shown in FIG. 20 illustrating an EGR gas distributor in a plan view, the gas inflow passage 12 may be configured to branch off in a single stage toward the four gas distribution passages 14A to 14D.

Figure 21:
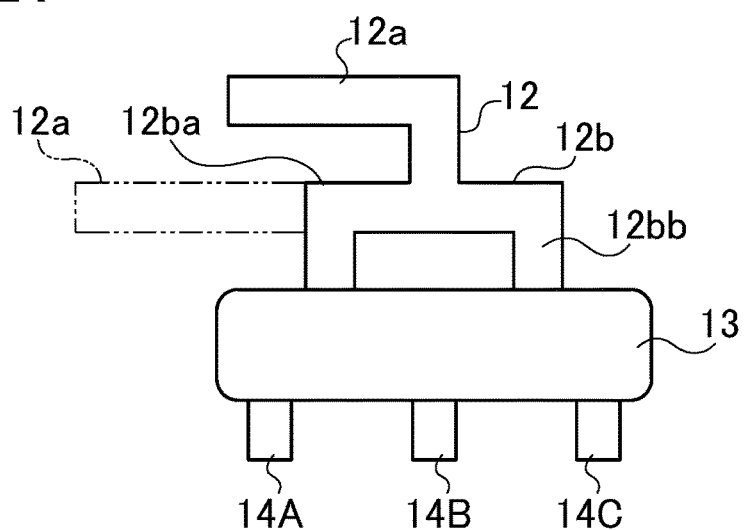
FIG. 21 is a plan view of an EGR gas distributor in another embodiment.

(7) In each of the foregoing embodiments, the EGR gas distributor 1 is configured to distribute EGR gas to four branch pipes 4 of the intake manifold 2. As an alternative thereto, as shown in FIG. 21 illustrating an EGR gas distributor in a plan view, this EGR gas distributor may be configured to distribute EGR gas to three branch pipes. Further, as indicated by a two-dot chain line in FIG. 21, the first gas passage part 12a may be connected to one end side of the second gas passage part 12b, instead of the center of the second gas passage part 12b.

Figure 20:
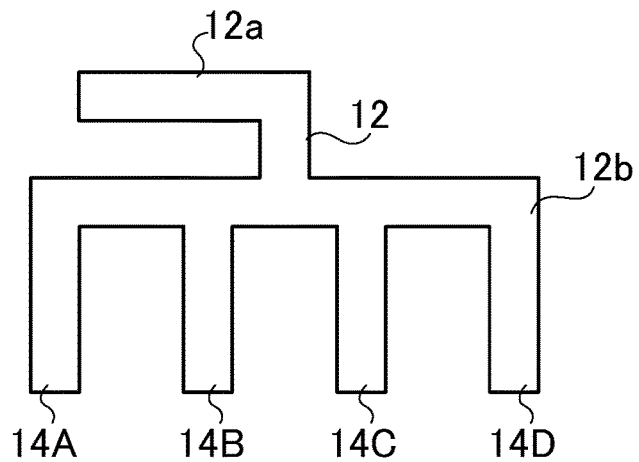
FIG. 20 is a plan view of an EGR gas distributor in another embodiment.
Figure 22:
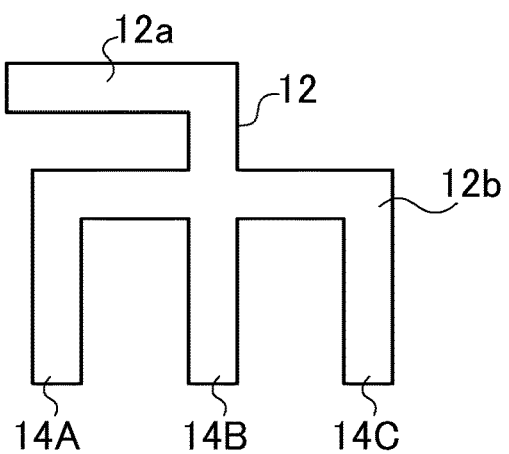
FIG. 22 is a plan view of an EGR gas distributor in another embodiment.

(8) In the foregoing alternative embodiment (6), the gas inflow passage 12 is configured to branch off in a single stage toward the four gas distribution passages 14A to 14D as shown in FIG. 20 illustrating the EGR gas distributor in the plan view. As another alternative thereto, as shown in FIG. 22 illustrating an EGR gas distributor in a plan view, the gas inflow passage 12 may be configured to distribute EGR gas to three branch pipes.

(9) In each of the foregoing embodiments, the EGR gas distributor 1 is made up of a single casing; however, the EGR gas distributor may be integrally made up of an upper casing and a lower casing.

(10) In each of the foregoing embodiments, the EGR gas distributor 1 is produced in advance separately from the intake manifold 2 and retrofitted onto the intake manifold 2. As an alternative thereto, the EGR gas distributor may be configured integrally with the intake manifold.

INDUSTRIAL APPLICABILITY

The present disclosure is utilizable in an EGR apparatus to be mounted in a gasoline engine and a diesel engine.

REFERENCE SIGNS LIST

1 EGR gas distributor
2 Intake manifold
4 Branch pipe
12 Gas inflow passage (Gas passage)
12a First gas passage part (Gas passage)
12b Second gas passage part (Gas passage)
13 Gas chamber (Gas passage, Final-stage gas passage part)
14A to 14D Gas distribution passage
21, 41 EGR gas distributor
UV Uppermost vertex
LV Lowermost vertex
CS1, CS2, CS3, CS4, CS5, CS6 Passage cross-section
H1, H2, H3, H4, H5, H6 Vertical length

What is claimed is:
1. An EGR gas distributor configured to distribute EGR gas to each of a plurality of branch pipes constituting an intake manifold, the EGR gas distributor comprising:
a plurality of gas distribution passages arranged side by side to distribute EGR gas to the plurality of branch pipes; and
a gas passage branched off to allow EGR gas to flow to the plurality of gas distribution passages, wherein
the gas passage includes a plurality of gas passage parts branched off in multiple stages, the gas passage parts including a final-stage gas passage part in communication with the gas distribution passages,
each of the gas passage parts has a passage cross-section perpendicular to a central axis so that the passage cross-section has a shape including an uppermost vertex and a lowermost vertex when the EGR gas distributor is mounted on the intake manifold,
the passage cross-section of each of the gas passage parts, except the final-stage gas passage part, changes so that a vertical dimension is gradually longer from a most upstream position to a most downstream position and so that each of the gas passage parts has an inner surface inclined along a longitudinal direction of each of the gas passage parts, each of the gas passage parts has an inner wall defining outer shapes of the passage cross-sections and including a valley line, the lowermost vertex corresponds to the valley line of the inner wall, and when the EGR gas distributor is mounted on the intake manifold, the gas passage parts each have a shape that the valley line of the inner wall is inclined downward in a flowing direction of the EGR gas.

2. The EGR gas distributor according to claim 1, wherein the passage cross-sections of the gas passage parts include a circular shape and an elliptic shape.

3. The EGR gas distributor according to claim 2, wherein the gas passage includes an inlet and is branched off from the inlet to the final-stage gas passage part, and the final-stage gas passage comprises a gas chamber configured to collect EGR gas.

4. The EGR gas distributor according to claim 2, wherein the gas passage includes an inlet and has a tournament branch shape extending from the inlet to the plurality of gas distribution passages.

5. The EGR gas distributor according to claim 1, wherein the gas passage includes an inlet and is branched off from the inlet to the final-stage gas passage part, and the final-stage gas passage comprises a gas chamber configured to collect EGR gas.

6. The EGR gas distributor according to claim 1, wherein the gas passage includes an inlet and has a tournament branch shape extending from the inlet to the plurality of gas distribution passages.

7. The EGR gas distributor according to claim 1, wherein the passage cross-sections of the gas passage parts transition from an elliptic shape to a circular shape in a direction from a most upstream position to a most downstream position of each of the gas passage parts.

* * * * *